United States Patent
Kawata et al.

(10) Patent No.: US 6,292,231 B1
(45) Date of Patent: Sep. 18, 2001

(54) COLOR SIGNAL GENERATION CIRCUIT

(75) Inventors: Junichi Kawata, Gunma-ken; Masayuki Naito, Sano, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 08/997,876

(22) Filed: Dec. 24, 1997

(30) Foreign Application Priority Data

Dec. 27, 1996 (JP) .................................................... 8-350535
Jan. 21, 1997 (JP) .................................................... 9-008945
Feb. 25, 1997 (JP) .................................................... 9-041106

(51) Int. Cl.$^7$ ............................. H04N 17/00; H04N 9/44; H04N 9/455; H04N 5/05; H04N 5/45; H04N 9/64
(52) U.S. Cl. ..................... 348/708; 348/708; 348/502; 348/524; 348/182
(58) Field of Search ..................... 348/708, 502, 348/524, 645, 659, 653, 654, 600, 177, 178, 179, 181, 182; H04N 5/04, 5/05, 9/68, 9/67, 9/64, 9/76, 17/00

(56) References Cited

U.S. PATENT DOCUMENTS

| | | | |
|---|---|---|---|
| 4,149,178 | * 4/1979 | Estes | 358/10 |
| 4,303,938 | * 12/1981 | Berke et al. | 358/139 |
| 4,468,687 | * 8/1984 | Munezawa et al. | 358/19 |
| 4,578,673 | * 3/1986 | Yianilos et al. | 340/703 |
| 5,774,184 | * 6/1998 | Murakami | 348/506 |
| 5,786,866 | * 7/1998 | Sani et al. | 348/520 |
| 5,966,184 | * 10/1999 | Boehlke | 348/524 |

* cited by examiner

*Primary Examiner*—Reinhard J. Eisenzopf
*Assistant Examiner*—Paulos Natnael
(74) *Attorney, Agent, or Firm*—Armstrong, Westerman, Hattori, McLeland & Naughton, LLP

(57) ABSTRACT

A reference signal having either twice or four times the frequency of a color burst signal (2fsc or 4fsc) is divided into a plurality of divided signals, each having the same frequency as that of the color burst signal, or an fsc frequency. In addition, a reference signal is delayed by a predetermined amount to thereby generate a delay signal. One of the divided signals is output in synchronism with this delay signal as a first divided signal having a predetermined delay. When this first divided signal is used as a color burst signal, the remaining divided signals resultantly all have phases shifted by a predetermined amount with respect to the color burst signal. With this arrangement, some of the divided signals can be used intact as a color signal, while the others may also be used after being delayed by a predetermined amount.

18 Claims, 9 Drawing Sheets

COLOR SIGNAL GENERATION CIRCUIT

BACKGROUND OF THE INVENTION

1. Field of the Invention

The present invention relates to a color signal generation circuit related to on-screen displays for a home-use VCRs or the like and, in particular, to a color signal generation circuit for coloring internally prepared displays.

2. Description of the Related Art

FIG. 1 shows a conventional color signal generation circuit for use in internally preparing display pictures. This circuit comprises a color signal generation circuit 4, a divider 1, and a shift circuit 2. The color signal generation circuit 4 generates eight color signals having phases shifted in 45° steps. The divider 1, comprising flip flops 1a, 1b, divides a 4fsc subcarrier whose frequency is four times that of a color burst signal (wherein 1 fsc is 3.58 MHz in NTSC), into a plurality of divided signals. The shift circuit 2 shifts the phases of divided signals outputted by the divider 1, in accordance with a clock signal supplied via an inverter 3.

As a result of the functions of the divider 1 and the shift circuit 2, eight signals with various phases, namely $\phi 0$ to $\phi 7$ in FIG. 2, are generated. Six out of the eight generated signals are input into respective delay circuits 11 to 16, which then delays received signals as required to adjust their phases so that they correspond to desired colors. FIG. 2 shows waveforms of various signals.

According to a circuit as shown in FIG. 1, it is possible to generate a plurality of color signals because a 4fsc signal is divided into signals with phases shifted in 45° steps, and the resulting signals are delayed so as to correspond to desired colors.

The above color signal generation circuit, however, has a problem in that it requires a dedicated circuit for every color. As a delay circuit often requires a capacitor and cannot be easily integrated into an IC circuit, provision of dedicated circuits for all colors increases costs.

SUMMARY OF THE INVENTION

The present invention has been conceived to overcome the above problems and aims to generate a plurality of color signals by employing a reduced number of delay circuits.

The present invention also aims to generate a plurality of color signals by using a signal with a low frequency.

According to the present invention, a reference signal having a frequency four times as large as that of a color burst signal is divided into a plurality of divided signals each having a fsc frequency, phase shifted in 45° steps. One of the divided signals is output as a color burst signal in synchronism with a delayed reference signal. Thus, the phase of a color burst signal is delayed with respect to divided signals. The other divided signal has the phase which is relatively shifted from the phase of the color burst signal because the phase of color burst signal is shifted. Assuming that the phase of a color burst signal is shifted by 15° with respect to a reference signal, color signals for green, cyan, magenta, and red can be obtained from a plurality of divided signals.

Further, when another delay circuit is provided to delay a reference signal by a predetermined amount so that a divided signal is latched and output according to a delayed reference signal, further different color signals can be obtained. For instance, when a reference signal is delayed by 28°, using this delayed reference signal and a 180° signal, a yellow signal (180°−28°+15°=167°) is obtained. Similarly, using the delayed reference signal and a 360° signal, a blue signal (360°−28°+15°=347°) is obtained.

Likewise, when a 2fsc signal having twice the frequency of a color burst signal is used as a reference signal, and divided signals each having a fsc frequency and with phases shifted in 90° steps are obtained, various color signals can be generated with a smaller number of delay circuits. For instance, when one of the plurality of divided signals is output in accordance with a signal which has been delayed by 14° with respect to a reference signal and used as a color burst signal, some of the other divided signals can be used intact as color signals. In addition, other divided signals can also be used as color signals when they are adjusted to have different phases from those of the above by using a 27° or 43° delayed reference signal. As a result, a plurality of color signals are obtained.

BRIEF DESCRIPTION OF THE DRAWINGS

The above and other objects, features, and advantages, will become further apparent from the following description of the preferred embodiment taken in conjunction with the accompanying drawings wherein.

DESCRIPTION OF THE PREFERRED EMBODIMENTS

Embodiment 1

Figure 3:
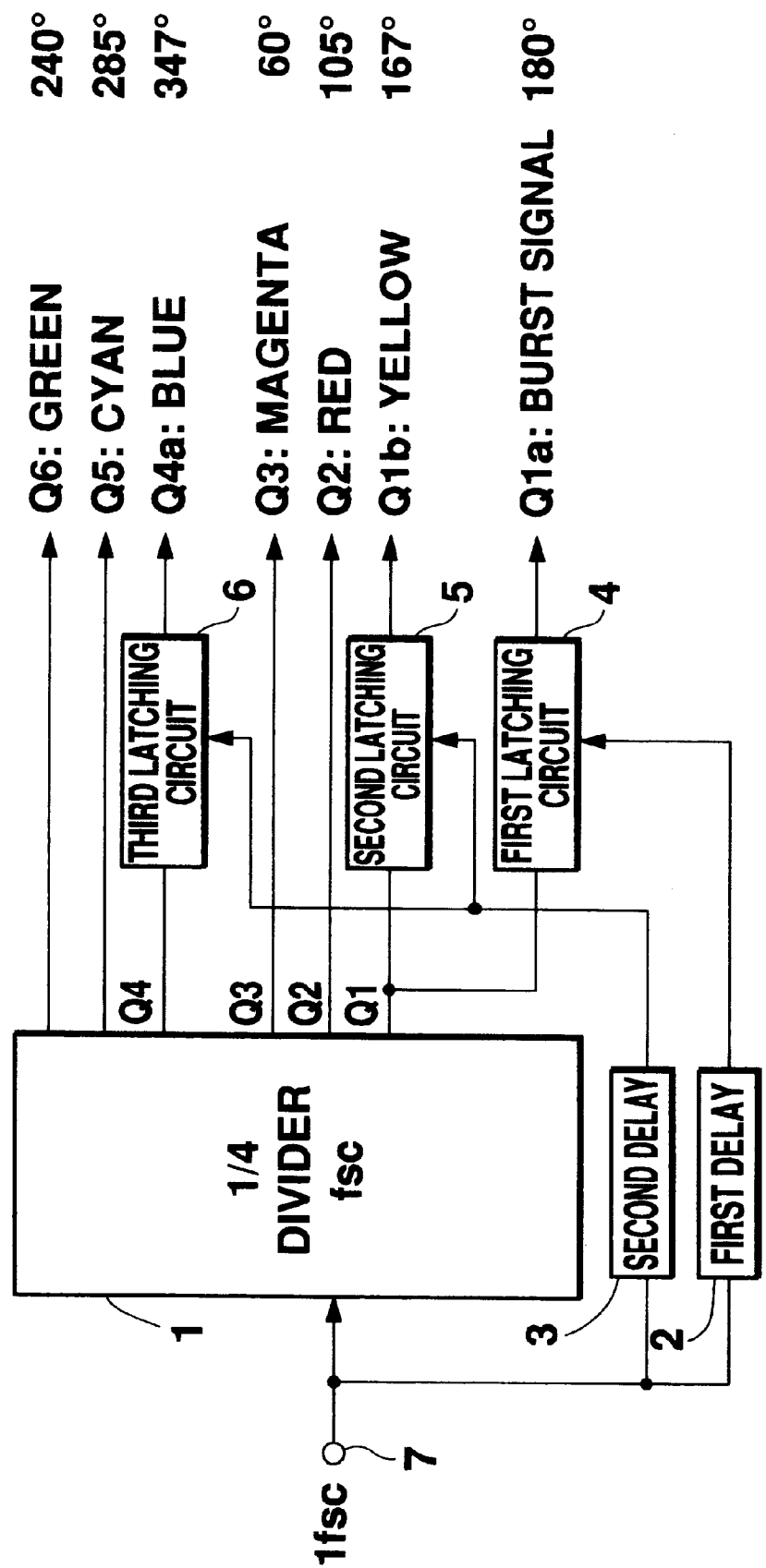
FIG. 3 is a diagram showing a color signal generation circuit according to a first preferred embodiment.

FIG. 3 shows a color signal generation circuit according to a first embodiment of the present invention. This circuit comprises a divider 1, a first delay circuit 2, a second delay circuit 3, a first latching circuit 4, a second latching circuit 5, and a third latching circuit 6. The divider 1 divides a 4fsc subcarrier whose frequency is four times as high as that of a color burst signal, into a plurality of divided signals each having a shifted phase in 45° steps. The first and second delay circuits 2, 3 delay the phase of a 4fsc subcarrier by 15 and 28°, respectively. The first latching circuit 4 receives a first output signal from the divider 1, and outputs the signal as a burst signal in synchronism with a delay signal supplied from the first delay circuit 2. Similarly, the second latching circuit 5 outputs a second output signal as a color signal (yellow) in synchronism with a delay signal from the second delay circuit 3; and the third latching signal 6 outputs a third output signal as a color signal (blue) in synchronism with a delay signal from the second delay signal 3.

Figure 1:
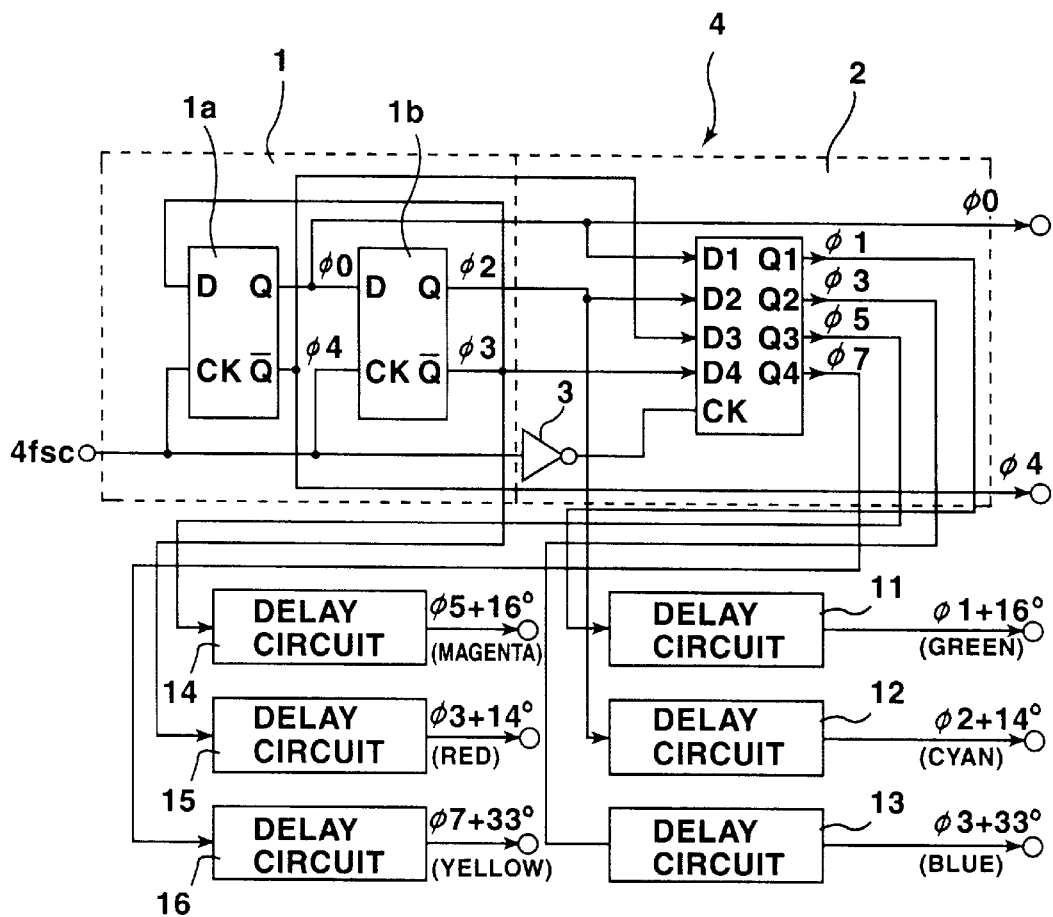
FIG. 1 is a diagram showing a conventional color signal generation circuit.
Figure 2:
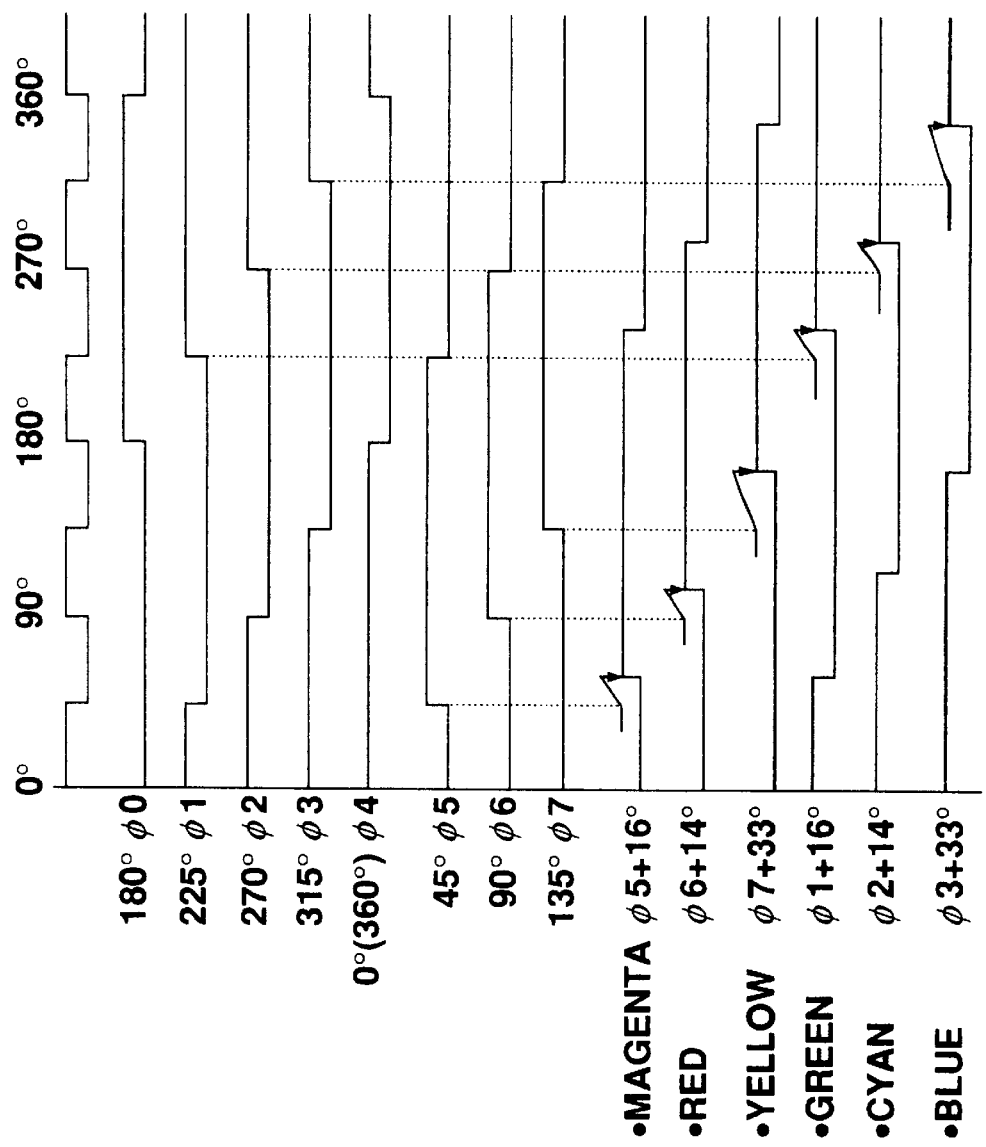
FIG. 2 is a diagram showing waveforms for explaining an operation of the circuit shown in FIG. 1.
Figure 4:
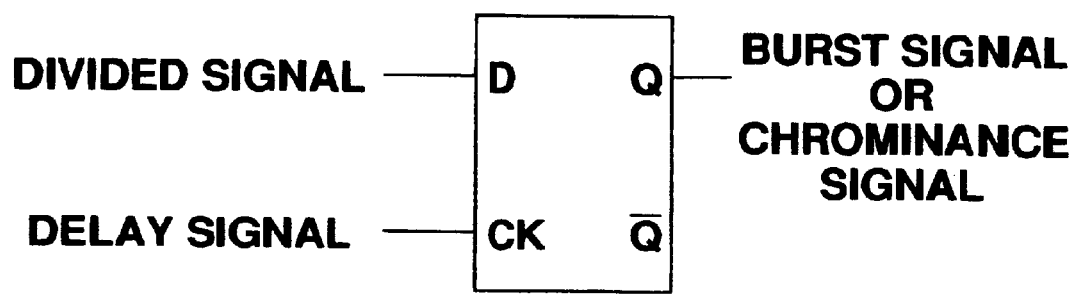
FIG. 4 is a diagram showing the structure of a latching circuit.

Since the divider 1 has the same structure as that shown in FIG. 1, its explanation will not be repeated here. Respective latching circuits 4, 5, 6 each comprise a D-type flip flap as shown in FIG. 4, which receives a signal from the divider 1 (a divided signal) at its D terminal, and a signal from a delay circuit (a delay signal) at its clock terminal.

Figure 5:
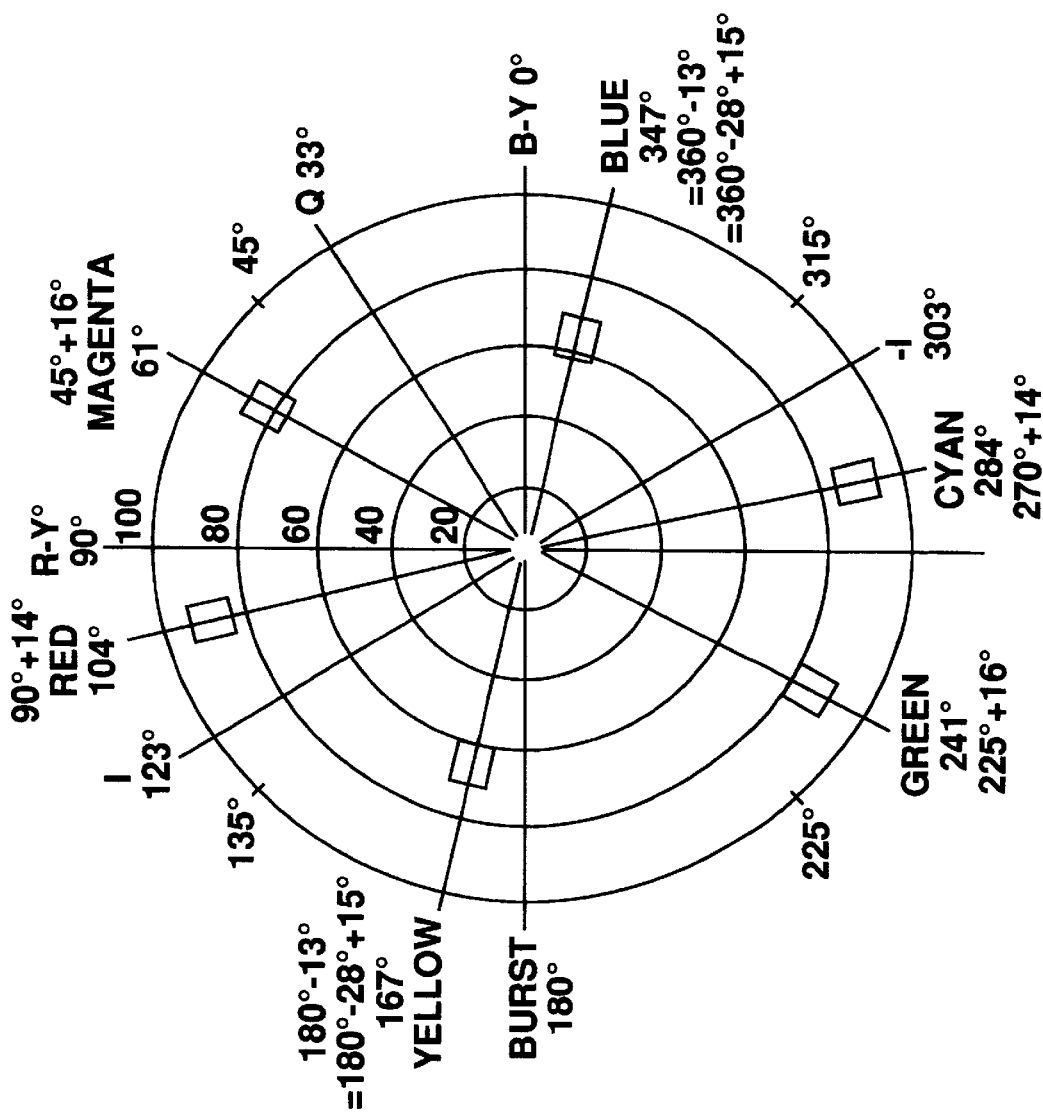
FIG. 5 is a diagram showing phase vectors concerning color signals.

FIG. 5 shows phase relationships among respective color signals. In this diagram, a burst signal is shown at 180 on the B-Y axis. The divider 1 can form a 0° signal, a 45° signal, a 90° signal, a 135° signal, a 180° signal, a 225° signal, a 270° signal, and a 315° signal.

Using the colors green and magenta in the drawing as an example, it can be known from the drawing that the phase of a green signal is shifted by a further 16° past 225°, while that of a magenta signal exceeds 45° by 16°. As such, those signals can be adjusted by the same phase shifting circuit.

Also, since phases of red and cyan signals are both shifted 14° past 90° and 270°, respectively, those signals can be adjusted by one phase shifting circuit.

As described above, 16° advancing could generate green and magenta signals, while 14° advancing could generate red and cyan signals. Obviously, those signals can be generated with phase advancing by a similar amount.

In this invention, a uniformed advancement, i.e., 15°, is done to generate the above four color signals. With 15° advancing, which is 1 short/excess for any of the four colors, respective original colors will not be noticeably. The 15° advancing may be achieved by delaying the phase of a burst signal by as many degrees, or, alternatively, by using a phase shifting circuit. In this invention, the former method is employed. With the above arrangement, four colors can be relatively made, wherein each color signal is expressed by means of a phase difference with respect to a burst signal.

Referring to FIG. 3, a 4fsc signal is applied to the terminal 7. The phase of a 4fsc signal is delayed by 15° in the first delay circuit 2 before being input as a clock signal to the first latching circuit 4 which generates a burst signal. The divider 1 outputs signals Q1 to Q6 each having a fsc frequency and phase shifted in 45° steps.

Figure 6:
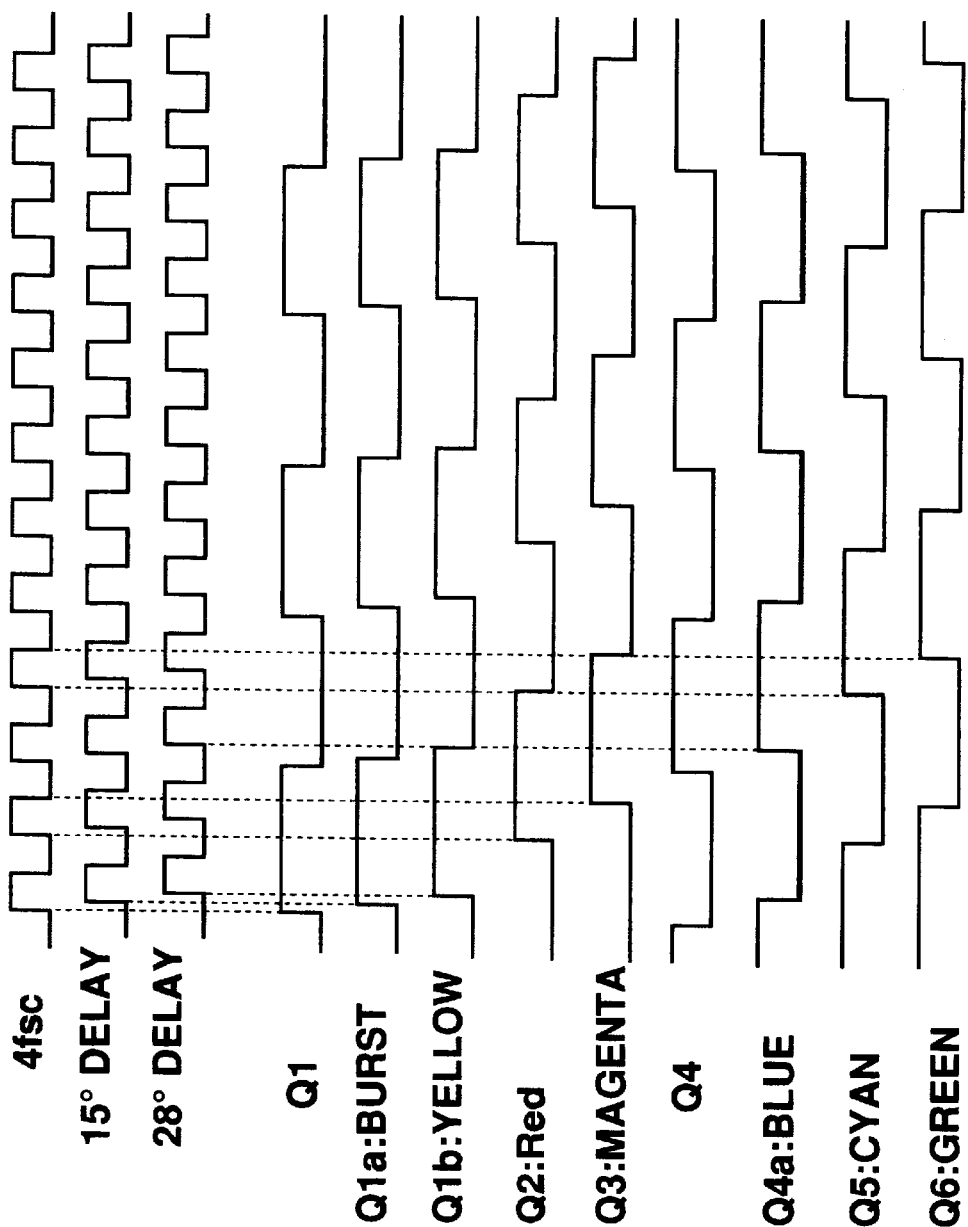
FIG. 6 is a diagram showing waveforms for explaining an operation of the circuit shown in FIG. 3.

FIG. 6 shows the state of generating the above signals. A 4fsc signal, denoted as "4fsc" in the drawing, is supplied via the terminal 7, and divided into signals Q1 to Q6 each having a fsc frequency. A signal Q1 is supplied as a data signal to the first latching circuit 4, which then outputs a burst signal, or Q1a in FIG. 6. As a burst signal has a shifted phase, respective divided signals from the divider 1 resultantly have shifted phases as below to correspond to the following colors.

| | |
|---|---|
| Q2 = red | 105 degrees |
| Q3 = magenta | 60 degrees |
| Q5 = cyan | 285 degrees |
| Q6 = green | 240 degrees |

Next, an example operation for the colors yellow and blue will be described.

Referring to FIG. 5, the phase of a yellow signal is delayed by 13° with respect to a burst signal, and that of a blue signal by 13° with respect to a 0° signal. As such, these two color signals can be adjusted by the same phase shifting circuit. Since the phase of a burst signal has already been delayed by 15°, a yellow signal should be subjected to a 28° (15°+13°) delay to be delayed by 13° with respect to a burst signal.

Referring to FIG. 6, the second latching circuit 5 outputs a signal Q1 according to a signal delayed by 28° (denoted as "28 DELAY" in the drawing) which was supplied by the second latching circuit 5 as a color signal (yellow) Q1b. Similarly, the third latching circuit 6 outputs a signal Q4 according to 28 DELAY as a color signal (blue) Q4a.

As described above, according to the circuit shown in FIG. 3, six color signals can be generated using only two delay circuits.

In other words, according to this preferred embodiment, there can be provided a color signal generation circuit which enables expression of six colors through use of two delay circuits in addition to logic circuits. That is, advantageously, the number of delay circuits can be significantly reduced.

Embodiment 2

Figure 7:
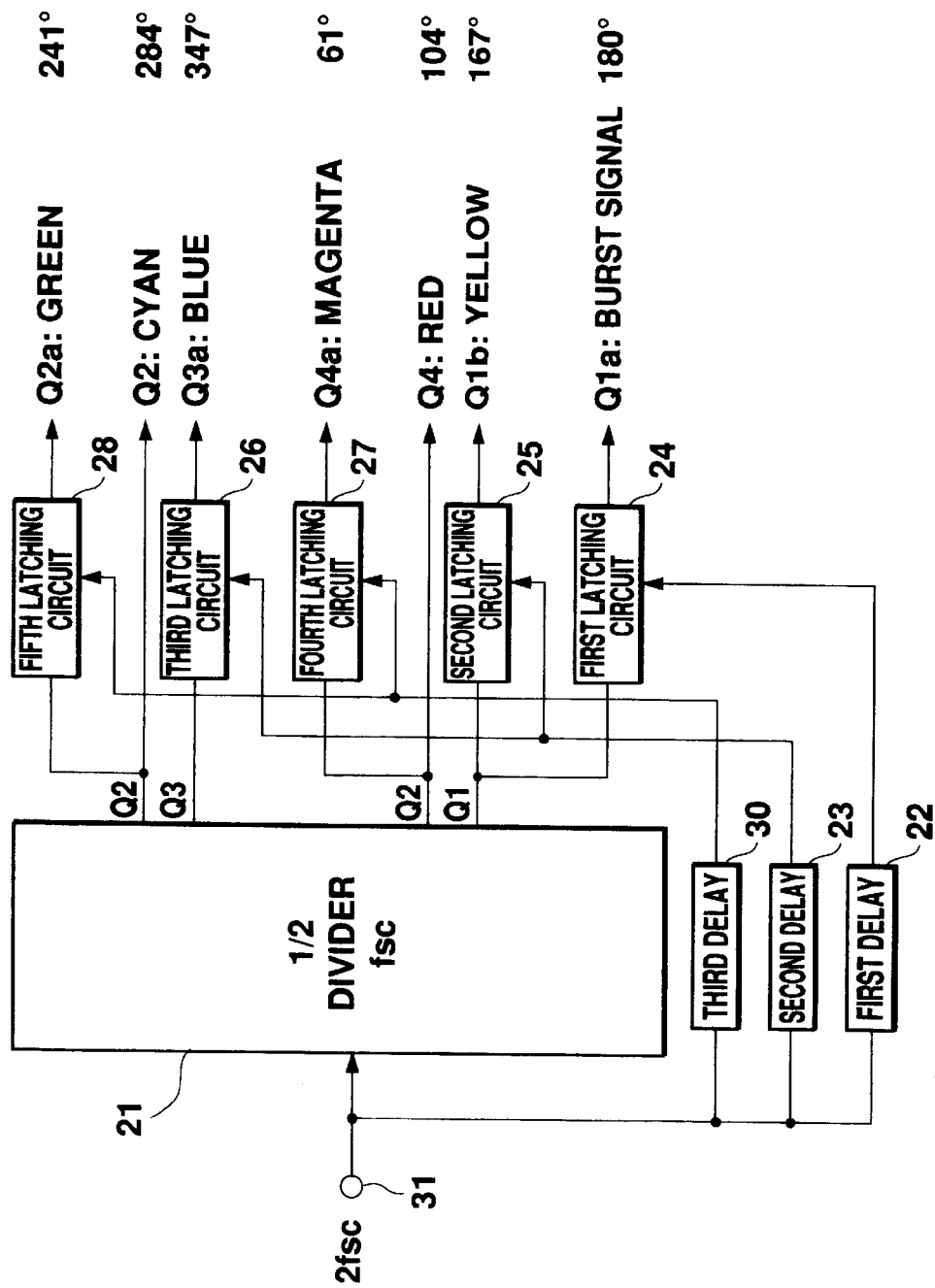
FIG. 7 is a diagram showing a color signal generation circuit according to a second preferred embodiment.

FIG. 7 shows a color signal generation circuit according to a second preferred embodiment of the present invention. This circuit comprises a divider 21, a first delay circuit 22, a second delay circuit 23, a third delay circuit 30, a first latching circuit 24, a second latching circuit 25, a third latching circuit 26, a fourth latching circuit 27, and a fifth latching circuit 28. The divider 21 divides a 2fsc subcarrier whose frequency is twice that of a color burst signal, into a plurality of divided signals Q1 to Q4 having phases shifted in 90° steps. The first, second, and third delay circuits 22, 23, 30 respectively delay the phase of a 2fsc subcarrier by 14°, 27°, and 43°. The first latching circuit 24 receives a divided output signal Q1 from the divider 21, and outputs the signal as a burst signal in synchronism with a delay signal from the first delay circuit 22. Similarly, the second latching circuit 25 outputs a divided output signal Q1 as a color signal (yellow) in synchronism with a delay signal from the second delay circuit 23; the third latching circuit 26 outputs a divided output signal Q3 as a color signal (blue) in synchronism with a delay signal from the second delay circuit 23; the fourth latching circuit 27 outputs a divided output signal Q4 as a color signal (magenta) in synchronism with a delay signal from the third delay circuit 30; and the fifth latching circuit 28 outputs a divided output signal Q2 as a color signal (green) in synchronism with a delay signal from the third delay circuit 30.

Since the divider 21 has the same structure as that shown in FIG. 1, its explanation will not be repeated here. Respective latching circuits 24, 25, 26, 27, 28 each comprise a D-type flip flop as shown in FIG. 4, which receives a signal from the divider 21 (a divided signal) at its D terminal, and a signal from a delay circuit (a delay signal) at its clock terminal.

Referring again to FIG. 5 for phase relationship, a burst signal is located at 180° on the B-Y axis. The divider 21 can form a 0° signal, a 90° signal, a 180° signal, and a 270° signal.

Figure 8:
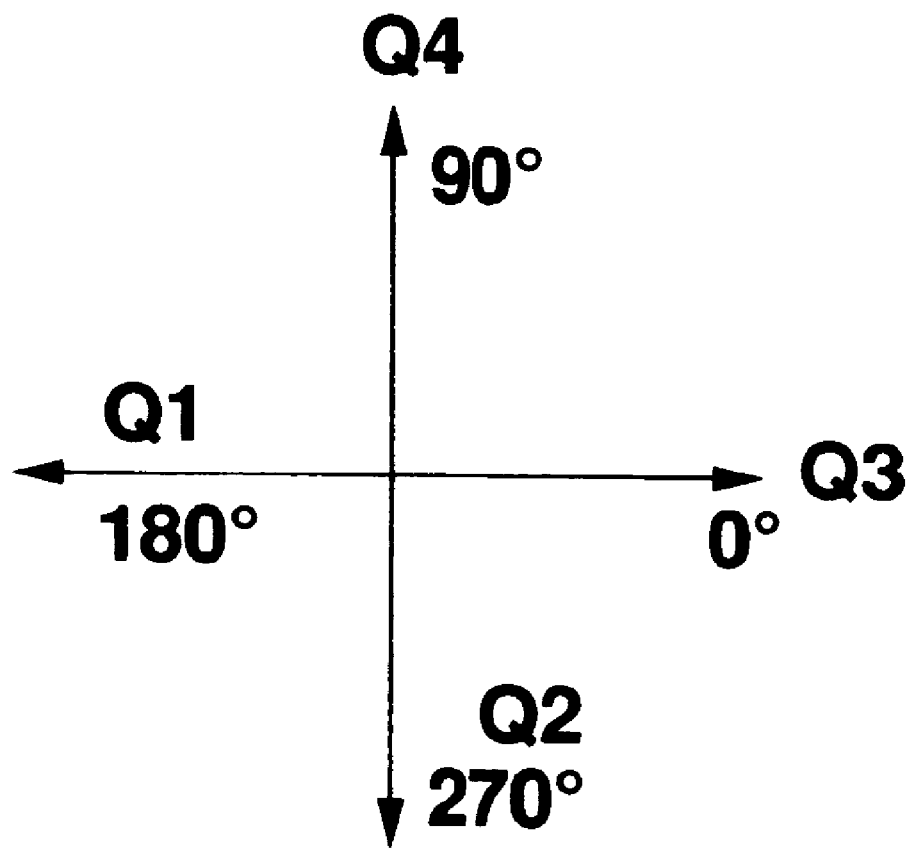
FIG. 8 is a diagram showing phase vectors concerning color signals.

In FIG. 7, a 2fsc signal is supplied via the terminal 31. A 2fsc signal is then inputted into the first delay circuit 22, which delays the phase of the signal by 14°. The delayed signal is input as a clock signal into the first latching circuit 24, which generates a burst signal. The divider 21 outputs four signals Q1 to Q4 each having a shifted phase in 90° steps. FIG. 8 shows the phase relationship among those signals Q1 to Q4, wherein signals Q1, Q2, Q3, and Q4 have phases shifted by 180°, 270°, 0°, and 90°, respectively. Using these four divided signals, six colors can be expressed as a result of the following phase combination.

| | |
|---|---|
| Red: | 104° = 90° + 14° (from Q4 in Fig. 8) |
| Cyan: | 284° = 270° + 14° (from Q2 in Fig. 8) |
| Yellow: | 167° = 180° − 13° (from Q1 in Fig. 8) |
| Blue: | 347° = 360° − 13° (from Q3 in Fig. 8) |
| Magenta: | 61° = 90° − 29° (from Q4 in Fig. 8) |
| Green: | 241° = 270° − 29° (from Q2 in Fig. 8) |

Obviously from the above, three shift types, i.e., +14°, −13°, and −29° shifts, enable expression of six colors. In the present invention, 14° advancing is made by the first delay circuit 22. With this advancing, the phase of a burst signal, which is a basis for color signal phase, is shifted. Shifting the phase of a burst signal results in producing the same effect as that obtained by shifting the phases of output signals from the divider 21. Specifically, respective output signals Q2 and Q4 from the divider 21 can be used intact as color signals (cyan) Q2 and (red) Q4.

Figure 9:
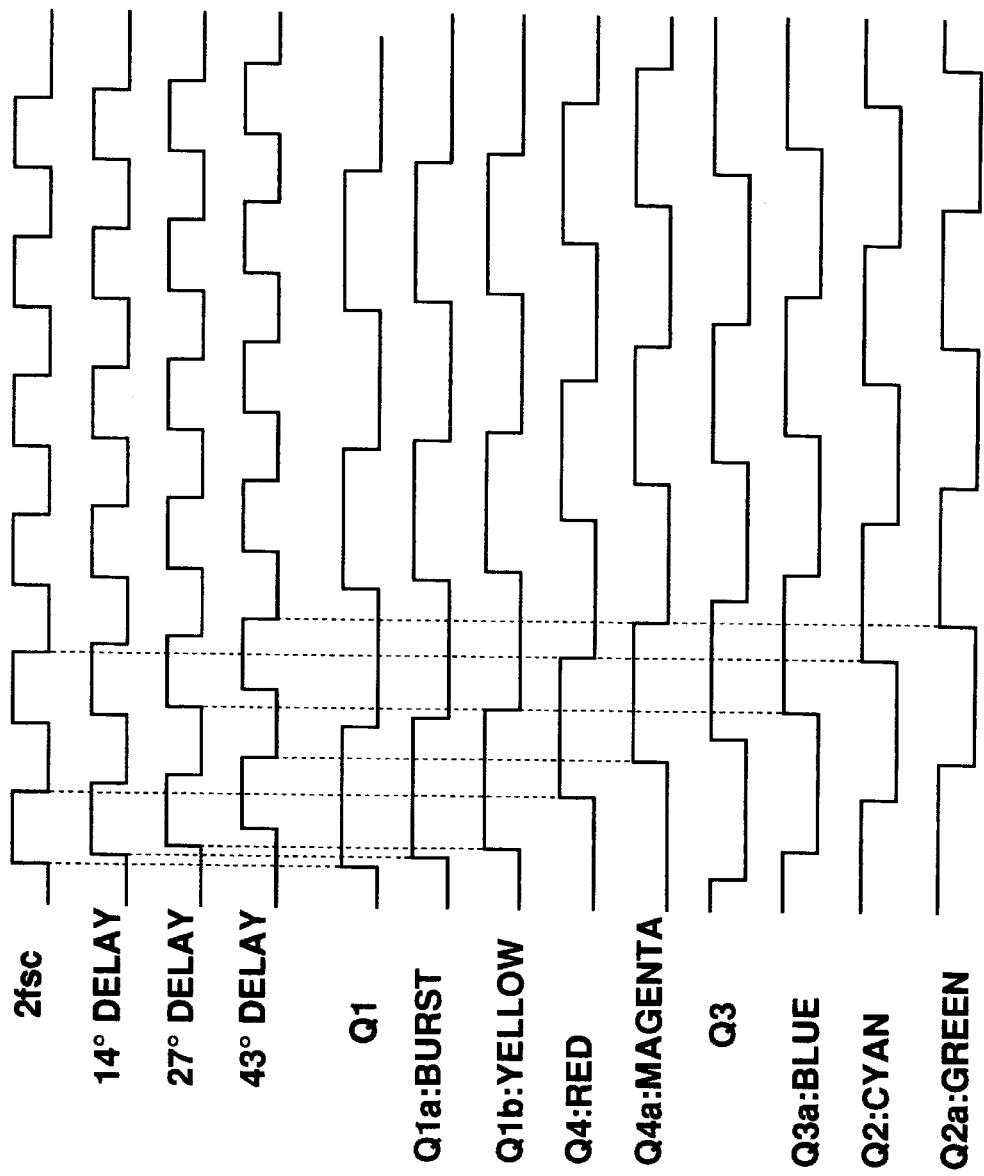
FIG. 9 is a diagram showing waveforms for explaining an operation of the circuit showing in FIG. 7.

FIG. 9 shows a state of generating the above signals. A 2fsc signal, denoted as "2fsc," is supplied via the terminal 31, and halved into signals Q2 to Q4 each having an fsc frequency. A signal Q1 is supplied as a data signal to the first latching circuit 24, which then outputs a burst signal Q1a according to a signal delayed by 14° (denoted as 14° DELAY). With this arrangement, divided output signals Q2, Q4 can be used intact as cyan and red signals Q2, Q4.

Next, a process of colors yellow and blue will be described.

Since a basis for color signal phases has already been shifted as above by the first delay circuit 22, in order to generate a signal with a phase delayed by 13°, a relevant phase must be delayed by 27° (−13°=−27°+14). Then, the second delay circuit 23 is provided to delay signal phases by −13° in order to generate yellow and blue signals.

For the colors magenta and green, a third delay circuit 23 is provided to make a −29° delay.

FIG. 9 also shows the state of generating the above signals. Specifically, divided signals Q1, Q3 are outputted from relevant latching circuits according to a signal with a 27° delay (denoted as 27° DELAY) supplied by the second delay circuit 23, as a yellow signal Q1b and a blue signal Q3a. Similarly, divided signals Q2, Q4 are output from relevant latching circuits according to a signal with a 43° delay (denoted as 43° DELAY) supplied by the third delay circuit 30, as a green signal Q2a and a magenta signal Q4a.

As described above, according to the circuit shown in FIG. 7, six colors can be accurately expressed using a 2fsc clock signal and three delay circuits.

In other words, according to this embodiment, there can be provided a color signal generation circuit which enables expression of six colors by using three delay circuits in addition to some logic circuits. As a result, the number of delay circuits can be significantly reduced, in addition to achieving an advantage that six colors can be accurately expressed by using a 2fsc clock signal.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A color signal generation circuit for generating a plurality color signals, comprising:
   a divider for dividing a reference signal having four times as high a frequency as that of a color burst signal into a plurality of divided signals with phases shifted in 45° steps;
   a first delay circuit for delaying the phase of said reference signal by a first delay amount to thereby obtain a first delay signal; and
   a first latching circuit for output one of the plurality of divided signals outputted by the divider, in synchronism with the first delay signal;
   wherein:
   the color signal generation circuit outputs a signal outputted by the first latching circuit as a color burst signal, and the plurality of divided signals outputted by the divider as a plurality of color signals.

2. The circuit as defined in claim 1, wherein:
   the first latching circuit comprises a D-type flip flop which receives one of the plurality of divided signals at a data input terminal and the first delay signal at a clock input terminal.

3. The circuit as defined in claim 1, wherein:
   the plurality of color signals output by the color signal generation circuit includes at least any one of green, cyan, magenta, and red signals.

4. The circuit as defined in claim 1, wherein the first delay amount is approximately 15°.

5. The circuit as defined in claim 1, further comprising:
   a second delay circuit for delaying the phase of a reference signal by a second delay amount to thereby obtain a second delay signal; and
   a second latching circuit for outputting any one of the plurality of divided signals output by the divider, in synchronism with the second delay signal;
   wherein:
   the color signal generation circuit outputs a signal output by the second latching circuit, as one color signal.

6. The circuit as defined in claim 5, wherein the second delay amount is approximately 28°.

7. The circuit as defined in claim 5, wherein:
   the second latching circuit receives a divided signal which is different from a divided signal supplied to the first latching circuit.

8. The circuit as defined in claim 5, wherein:
   the second latching circuit receives the same divided signal as a divided signal supplied to the first latching circuit.

9. The circuit as defined in claim 5, further comprising:
   the second latching circuit for outputting the same divided signal as a divided signal supplied to the first latching circuit from the divider, in synchronism with the second delay signal;
   a third latching circuit for outputting a divided signal which is different from a divided signal supplied to the first latching circuit, in synchronism with the second delay signal;
   wherein
   the color signal generation circuit outputs signals outputted by the second latching circuit and by the third latching circuit as separate color signals.

10. A color signal generation circuit for generating a plurality color signals, comprising:
    a divider for dividing a reference signal having twice as high a frequency as that of a color burst signal into a plurality of divided signals having phases shifted in 9° steps;
    a first delay circuit for delaying the phase of said reference signal by a first delay amount to thereby obtain a first delay signal; and
    a first latching circuit for outputting one of the plurality of divided signal output by the divider, in synchronism with the first delay signal;
    wherein:
    the color signal generation circuit outputs a signal output by the first latching circuit as a color burst signal and the plurality of divided signals output by the divider as a plurality of color signals.

11. The circuit as defined in claim 10, wherein the first latching circuit comprises a D-type flip flop which receives one of the plurality of divided signals at a data input terminal and the first delay signal at a clock input terminal.

12. The circuit as defined in claim 10, wherein the plurality of color signal output by the color signal generation circuit includes at least any one of cyan, and red signals.

13. The circuit as defined in claim 10, wherein the first delay amount is approximately 14°.

14. The circuit as defined in claim 10, further comprising:
a second delay circuit for delaying the phase of a reference signal by a second delay amount to thereby obtain a second delay signal; and
a second latching circuit for outputting any one of the plurality of divided signals output by the divider, in synchronism with the second delay signal;
wherein:
the color signal generation circuit outputs a signal output by the second latching circuit, as one color signal.

15. The circuit as defined in claim 10, wherein the second delay amount is approximately 27°.

16. The circuit as defined in claim 14, further comprising:
a third latching circuit for outputting any one of the plurality of divided signals outputted by the divider and different from a divided signal supplied to the second latching circuit, in synchronism with the second delay signal.

17. The circuit as defined in claim 10, further comprising:
a third delay circuit for delaying the phase of a reference signal by a third delay amount to thereby obtain a third delay signal; and
a third latching circuit for outputting any one of the plurality of divided signals which is output by the divider, in synchronism with the third delay signal;
wherein:
the color signal generation circuit outputs a signal output by the third latching circuit, as one color signal.

18. The circuit as defined in claim 17, further comprising:
a fourth latching circuit for outputting any one of the plurality of divided signals which is output by the divider and different from a divided signal supplied to the second latching circuit, in synchronism with the third delay signal,
wherein:
the color signal generation circuit outputs a signal output by the fourth latching circuit as one color signal.

* * * * *